United States Patent [19]

Ferree et al.

[11] Patent Number: 5,051,892

[45] Date of Patent: Sep. 24, 1991

[54] FULL DUPLEX CONVERSATION BETWEEN TRANSACTION PROGRAMS

[75] Inventors: Marsha E. Ferree, Raleigh; James P. Gray; Mark Pozefsky, both of Chapel Hill; John F. Wilder, Raleigh, all of N.C.

[73] Assignee: International Business Machines Corp., Armonk, N.Y.

[21] Appl. No.: 308,292

[22] Filed: Feb. 9, 1989

[51] Int. Cl.⁵ .............................................. G06F 1/00
[52] U.S. Cl. .................................... 364/200; 379/209
[58] Field of Search ... 364/200 MS File, 900 MS File; 370/60, 94.1, 110.1; 379/209

[56] References Cited

U.S. PATENT DOCUMENTS

| | | | |
|---|---|---|---|
| 4,019,176 | 4/1977 | Cour et al. | 364/900 |
| 4,213,201 | 7/1980 | Gagnier et al. | 370/62 |
| 4,412,285 | 10/1983 | Neches et al. | 364/200 |
| 4,419,756 | 12/1983 | Cheng-Quispe et al. | 364/900 |
| 4,494,194 | 1/1985 | Harris et al. | 364/200 |
| 4,750,165 | 6/1988 | Champagne et al. | 370/110.1 |
| 4,768,150 | 8/1988 | Chang et al. | 364/300 |
| 4,817,092 | 3/1989 | Denny | 364/513 |

Primary Examiner—Stuart N. Hecker
Assistant Examiner—Rebecca L. Rudolph
Attorney, Agent, or Firm—John B. Frisone

[57] ABSTRACT

A method for the full duplex exchange of data via a conversation between a pair of transaction programs over a network in which any transaction program which requests a confirmation of previously sent data inhibits the further transmission of data until a response to the request is received and a transaction program which receives a request for confirmation will inhibit the receipt of data until a response to the confirmation request is sent. In addition, when a transaction program attempts to terminate a conversation a definite response is requested and the response to the termination will be queued behind any data which remains to be sent so as to purge that data from the network.

5 Claims, 4 Drawing Sheets

FIG. 3

| FIG. 3A |
|---------|
| FIG. 3B |

FIG. 3A

| FSM_CONVERSATION_FDX | RESET | SEND RCV RSTD | SEND RCV PRVG | SEND RCV PURGE | SENT CFRM RSTD | SENT CFRM PRVG | SENT CFRM PURGE |
|---|---|---|---|---|---|---|---|
| INPUTS | 1 | 2 | 3 | 4 | 5 | 6 | 7 |
| S, ALLOCATE | 2 | / | / | / | / | / | / |
| R, ATTACH | 3 | / | / | / | / | / | / |
| S, SEND_DATA | / | — | — | — | > | > | > |
| S, FLUSH | / | — | — | — | > | > | > |
| S, CONFIRM | / | 5 | 6 | 7 | > | > | > |
| S, SEND_ERROR_SEND | / | > | — | — | > | > | > |
| S, SEND_ERROR_RECEIVE | / | > | 4 | > | > | > | > |
| S, POST_ON_RECEIPT | / | — | — | — | — | — | — |
| S, TEST | / | — | — | — | — | — | — |
| S, RECEIVE_IMMEDIATE | / | — | — | — | — | — | — |
| S, RECEIVE_AND_WAIT | / | — | — | — | — | — | — |
| S, REQUEST_TO_SEND | / | — | — | — | — | — | — |
| R, DATA_INDICATOR | / | 3 | — | / | 6 | 6 | / |
| R, CONFIRM_INDICATOR | / | 8 | 8 | / | 9 | 9 | / |
| R, CONFIRM_DEALLOC_IND | / | 10 | 10 | / | 11 | 11 | / |
| R, CONFIRMED_INDICATOR | / | > | > | > | 2 | 3 | 4 |
| S, CONFIRMED | / | > . | > | > | > | > | > |
| R, RECEIVE_ERROR_RC | / | — | — | — | 2 | 3 | 4 |
| R, PROGRAM_ERROR_RC | / | — | — | — | — | — | — |
| R, SERVICE_ERROR_RC | / | — | — | — | — | — | — |
| R, DEALLOC_NORMAL_RC | / | 17 | 17 | 17 | 17 | 17 | 17 |
| R, DEALLOC_ABEND_RC | / | 17 | 17 | 17 | 17 | 17 | 17 |
| R, RESOURCE_FAILURE_RC | / | 17 | 17 | 17 | 17 | 17 | 17 |
| R, ALLOCATION_FAILURE_RC | / | 17 | / | / | 17 | / | / |
| S, DEALLOCATE_FLUSH | / | 1 | 1 | 1 | > | > | > |
| S, DEALLOCATE_CONFIRM | / | 14 | 15 | 16 | > | > | > |
| S, DEALLOCATE_ABEND | / | 1 | 1 | 1 | > | > | > |
| S, DEALLOCATE_LOCAL | / | > | > | > | > | > | > |
| S, GET_ATTRIBUTES | / | — | — | — | — | — | — |
| SIGNAL(END_PURGING) | / | / | / | 2 | / | / | 5 |

RC = RETURN CODE

/ = NOT POSSIBLE

— = REMAIN IN SAME STATE

> = ERROR VERB WILL BE REJECTED

NO (7) IN A CELL INDICATES TRANSACTION TO STATE (7)

FIG. 3B

| FSM_CONVERSATION_FDX INPUTS | RCVD CFRM 8 | CFRM XING CFRM 9 | RCVD CFRM DEAL 10 | CFRM XING CFRM DEAL 11 | CFRM DEAL XING CFRM 12 | CFRM DEAL XING CFRM DEAL 13 | SENT CFRM DEAL RSTD 14 | SENT CFRM DEAL PRVG 15 | SENT CFRM DEAL PURGE 16 | END CONV 17 |
|---|---|---|---|---|---|---|---|---|---|---|
| 6, ALLOCATE<br>R, ATTACH | / | / | / | / | / | / | / | / | / | / |
| 6, SEND_DATA<br>6, FLUSH<br>6, CONFIRM | ^ ^ ^ | ^ ^ ^ | – – 11 | ^ ^ ^ | ^ ^ ^ | ^ ^ ^ | ^ ^ ^ | ^ ^ ^ | ^ ^ ^ | ^ ^ ^ |
| 6, SEND_ERROR_SEND<br>6, SEND_ERROR_RECEIVE | – 2 | ^ 6 | – 2 | ^ 6 | ^ 14 | ^ 14 | ^ ^ | ^ 14 | ^ ^ | ^ ^ |
| 6, POST_ON_RECEIPT<br>6, TEST<br>6, RECEIVE_IMMEDIATE<br>6, RECEIVE_AND_WAIT<br>6, REQUEST_TO_SEND | ^ ^ ^ ^ – | ^ ^ ^ ^ – | ^ ^ ^ ^ – | ^ ^ ^ ^ – | ^ ^ ^ ^ – | ^ ^ ^ ^ – | ^ ^ ^ ^ – | ^ ^ ^ ^ – | ^ ^ ^ ^ – | ^ ^ ^ ^ – |
| R, DATA_INDICATOR<br>R, CONFIRM_INDICATOR<br>R, CONFIRM_DEALLOC_IND | / / / | / / / | / / / | / / / | / / / | / / / | 15 12 13 | – 12 13 | – – – | / / / |
| R, CONFIRMED_INDICATOR | / | / | / | / | / | 1 | 1 | 1 | 1 | / |
| 6, CONFIRMED | 2 | 6 | 17 | 17 | 14 | / | ^ | ^ | ^ | ^ |
| R, RECEIVE_ERROR_RC<br>R, PROGRAM_ERROR_RC<br>R, SERVICE_ERROR_RC | / / / | / / / | / / / | / / / | / / / | / / / | 2 – – | 3 – – | 4 – – | / / / |
| R, DEALLOC_NORMAL_RC<br>R, DEALLOC_ABEND_RC<br>R, RESOURCE_FAILURE_RC<br>R, ALLOCATION_FAILURE_RC | / / / / | / / / / | / / / / | / / / / | / / / / | / / / / | 17 17 17 17 | 17 17 17 17 | 17 17 17 17 | / / / / |
| 6, DEALLOCATE_FLUSH<br>6, DEALLOCATE_CONFIRM<br>6, DEALLOCATE_ABEND<br>6, DEALLOCATE_LOCAL | 1 12 1 ^ | ^ ^ ^ ^ | 1 13 1 ^ | ^ ^ ^ ^ | ^ ^ ^ ^ | ^ ^ ^ ^ | ^ ^ ^ ^ | ^ ^ ^ ^ | ^ ^ ^ ^ | ^ ^ ^ 1 |
| 6, GET_ATTRIBUTES | – | – | – | – | – | – | – | – | – | – |
| SIGNAL(END_PURGING) | / | / | / | / | / | / | / | / | 14 | / |

5,051,892

FULL DUPLEX CONVERSATION BETWEEN TRANSACTION PROGRAMS

FIELD OF THE INVENTION

This invention relates to data communications and more particularly to full duplex data communication between end transaction programs and their interactive relationships with the interconnecting communication network. For this invention, the logical connection between two applications communicating with each other is called a conversation. The applications are called transaction programs.

BACKGROUND OF THE INVENTION

Transmission facilities between transaction programs connected to a data communication network may be conventionally classified as simplex, half-duplex or full-duplex. A simplex facility provides unidirectional transmission only from one transaction program to the other. A half-duplex facility is at any given instance in time similar to simplex; however, the direction in which the data flows can be reversed or turned around usually by mutual agreement of the transaction programs engaged in a conversation or data exchange over the facility. A full-duplex facility provides simultaneous two-way data exchange between the transaction programs engaged in a conversation. In the case of half-duplex and full-duplex conversation, the transaction programs involved in the conversation normally exchange control information as well as data via the interconnecting transmission media as described above. Due to the nature of the half-duplex connection, the message and control data sequence is maintained and each of the participants in the conversation can take appropriate actions in an orderly and timely manner. However, in the case of full-duplex conversations, this is not always possible due to the simultaneous bi-direction transmission capability.

In a full-duplex environment the independence of the receive and transmit functions sent and received must be correlated and can create a major problem for application programs when status, information and response messages get out of sequence due to the independence and different delay characteristics in the two paths over which these signals travel.

SUMMARY OF THE INVENTION

The invention contemplates a method of exchanging information and control data between transaction applications in full-duplex mode utilizing one conversation, or logical connection, between the application programs.

BRIEF DESCRIPTION OF THE DRAWINGS

FIGS. 3, 3A and 3B are a diagram in tabular form illustrating a finite state machine defining the novel full duplex conversation interface between the LU and the transaction program (TP).

DETAILED DESCRIPTION

Figure 1:
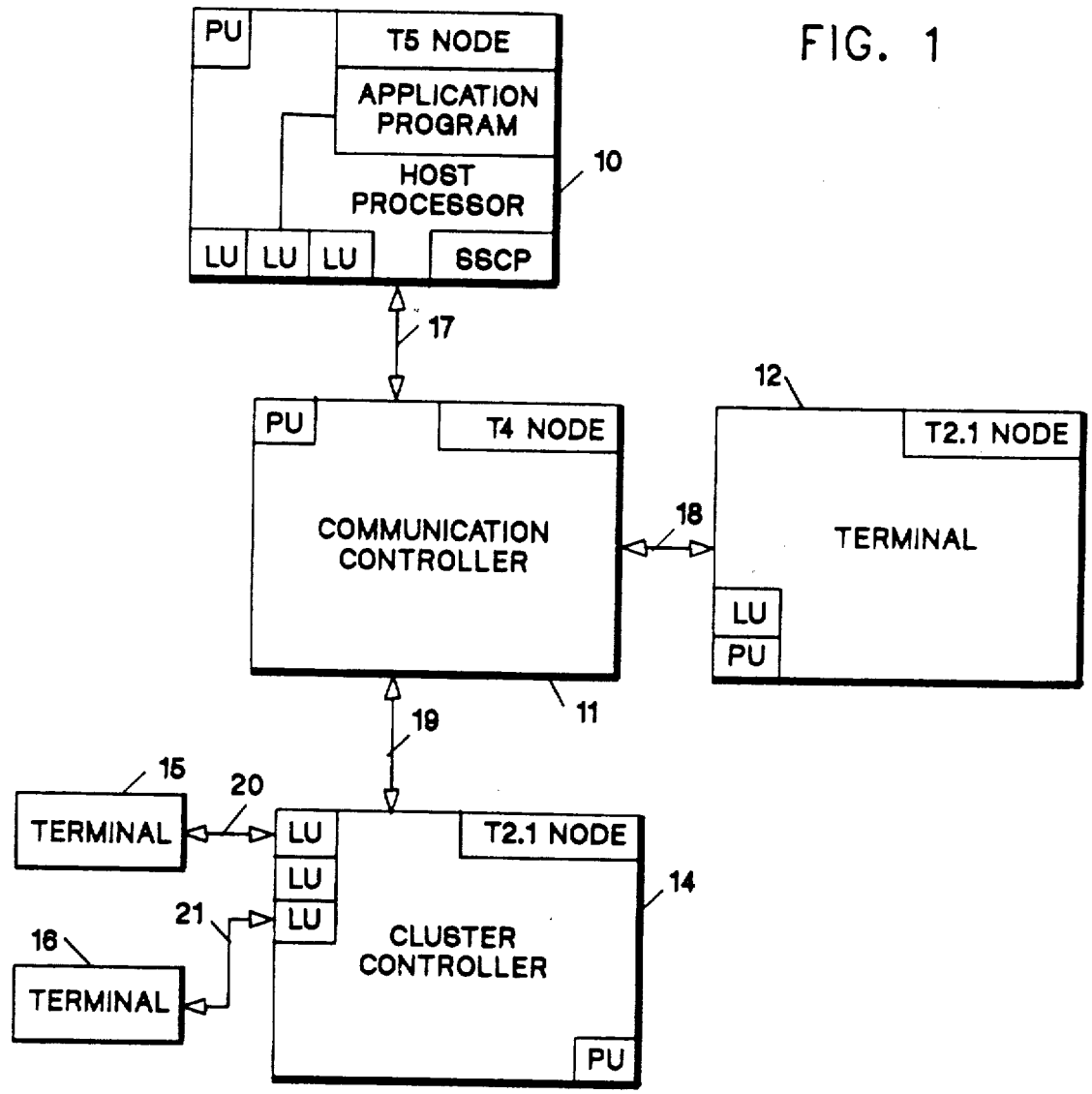
FIG. 1 is a block diagram of a data communication network within which the novel full duplex communication method may be utilized.

FIG. 1 is a block diagram of a typical data communication network which may employ the invention disclosed herein. The network may be constructed and configured in accordance with the IBM Systems Network Architecture (SNA) and more particularly LU Type 6.2. In the interest of economy, the descriptions which follow will refer to certain structures (both physical and logical), functions and commands related to that architecture. For a more complete description of the network architecture, reference may be had to the IBM publications listed below:

Systems Network Architecture: Format and Protocol Manual: Architecture Logic for LU Type 6.2 (SC30-3269-2) 4th Ed., copyright 1985, International Business Machines Corporation;

Systems Network Architecture; Transaction Programmer's Reference Manual for LU Type 6.2 (GC30-3084-2) 3rd Ed., copyright 1985, International Business Machines Corporation.

In FIG. 1 a plurality of nodes 10, 11, 12 and 14 are interconnected by physical links 17, 18 and 19. The physical links may be either full-duplex or half-duplex or a combination of both. Node 10 is a type T5 node as defined in the architecture and includes a physical unit (PU), one or more logical units (LU), a system services control point (SSCP) and one or more end user transaction programs, as well as a control program. This node is typically a host processor, such as an IBM 3090, which may perform a number of functions for terminals or other processors connected to the network which may be a distributed processing network.

Node 11 in the illustrated network may typically be a communication controller such as the IBM 3705 and meets the node type T4 defined in the IBM SNA architecture. This node is provided with a physical unit (PU). Both nodes 12 and 14 are type T2.1 according to the SNA architecture. Node 12 may be a terminal such as an intelligent work station and includes a physical unit (PU) and a logical unit (LU). Node 14 may be a cluster controller which includes a physical unit (PU) and a plurality of logical units (LU). A number of terminals such as 15 and 16 may be connected to the cluster controller 14 by physical transmission media 20 and 21, respectively.

Each of the PUs, LUs and SSCP have a unique network address and are therefore network addressable units (NAUs), the network address which is used to route messages. In addition, each has a network name which is independent of the physical location and the associated address is obtained from SSCP which translates the network name to a network address via a network directory service facility.

Figure 2:
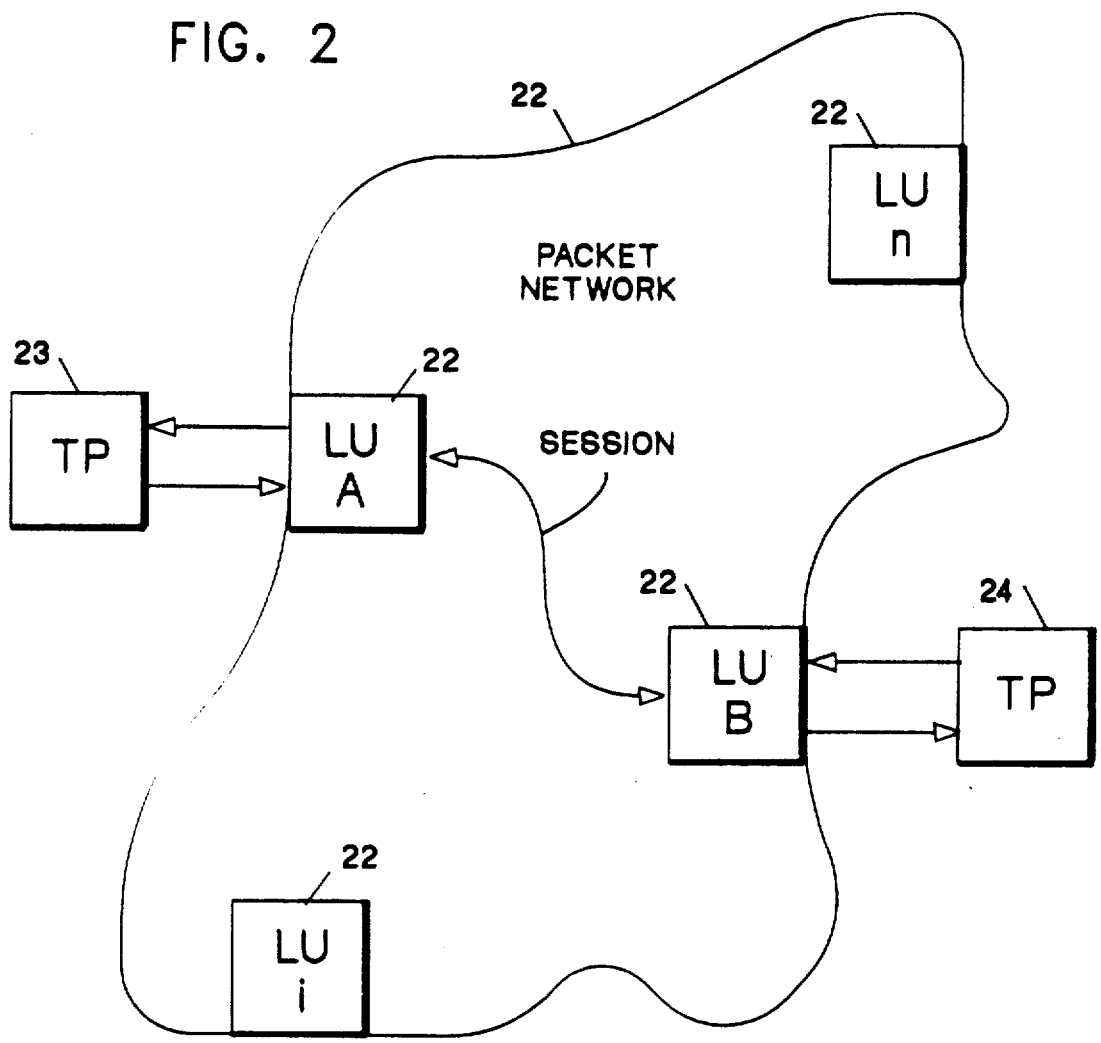
FIG. 2 is a simplified block diagram of the network illustrated in FIG. 1.

As illustrated in FIG. 2, logical units 22, such as units A and B, establish a session through the network using other network elements; however, from the user point of view, transaction programs 23 and 24, these additional network elements do not appear to exist.

The end users such as TP23 and TP24 communicate with each other via their respective LUs 22A and 22B over a session which has been previously established therebetween. The communication takes place in a conversation which can be started by either transaction program. The conversation is invoked when one of the end user transaction programs issues an ALLOCATE verb and appropriate parameters to the LU to which it is logically connected. The verb ALLOCATE and the parameters associated therewith are defined in the transaction Programmer's Reference Manual for LU Type 6.2 cited above. In addition, this manual describes all of the verbs and the parameters associated therewith in the IBM SNA LU Type 6.2 architecture.

The current network architecture Type LU 6.2 supports only half-duplex conversations between TPs; simultaneous send/receive capability is not a straightforward duplication of the existing half-duplex capability.

Since each of the partner TPs engaged in a full-duplex conversation can simultaneously send and receive, verbs such as CONFIRM can cross. A crossing occurs when both TPs issue a verb before the other TP receives the issued verb. This condition cannot occur in the current half-duplex version of LU 6.2. In the half-duplex version, when a TP issues a verb such as CONFIRM, the conversation is suspended (the TP can issue no other verbs) until the other TP responds to the received CONFIRM issued by its partner TP.

If the half-duplex function were merely duplicated, a crossing of the CONFIRM verb could result in a deadlocked conversation. For example, other's CONFIRM with either a CONFIRMED or error response and the conversation between the TPs is deadlocked and can progress no further.

Ideally, a solution to the deadlock problem which has little or no impact on the existing architecture is most desirable since both types of conversation, half-duplex as well as full-duplex, need to be supported and the selection of which to use left to the users. Ideally, this needs to be accomplished with no change or little change to the existing half-duplex conversation process since a radical change would entail substantial economic penalties.

In addition to the crossing problem set forth above, the termination of a full-duplex conversation by one or both TPs requires a purging of data or information in the session between the TPs' LUs. This purging is not a problem in a half-duplex conversation since only one of the TPs is able to send and terminate at any given time and the data preceding the termination is readily identified and poses no problem. However, in a full-duplex conversation, data in the session, if not purged or otherwise identified, can under certain conditions become concatenated to a subsequent data message and result in erroneous transmission.

FIG. 3 is a tabular diagram of a finite state machine for a full duplex conversation. The first column lists all of the inputs—verbs issued (S) and information received (R) on the conversation—while the first row lists all of the states of one TP's end of the conversation at the TP-LU interface. The intersection of each row and column specifies either by a symbol or a number the result of issuing or receiving one of the inputs while in the state indicated for that intersection.

The symbols used have the following significance. A (/) indicates that sending or receiving, as the case may be, a particular input (or verb, etc.) is not possible. A (>) indicates that sending the indicated input (to the TP's connected LU) is an error condition and the LU will reject the verb. A (-) indicates that the conversation will remain in the same state if the input is either sent or received as indicated in FIG. 3. A numeral (such as 5) indicates the number of the state the conversation will go to when the indicated input is either sent or received as indicated in FIG. 3. The letters (S) and (R) in the first column indicate Send and Receive, respectively, while the numerals in the first row indicate the state numbers and correspond to the numbers appearing at the column and row intersections which indicate the state into which the conversation will go.

In the description which follows, each of the inputs specified in FIG. 3 will be described and functional and format changes over those described in the cited manuals describing the IBM/SNA LU Type 6.2 architecture will be described. The description applies to either partner transaction program and its associated LU while the two LUs are assumed to have established at least one session therebetween in accordance with existing LU Type 6.2 procedures which are fully described in the cited manuals. In addition, each of the seventeen states which the conversation can assume will be identified and described.

Prior to the establishment of a conversation between two transaction programs, the conversation is in a reset state identified in FIG. 3 as state (1). In this state, a transaction program can initiate a full duplex (FDX) conversation by sending an ALLOCATE verb to its LU. The only modification to the ALLOCATE verb is the use of a new value of FDX_BASIC_CONVERSATION added to the existing conversation-type field of the verb.

In the description which follows, the terms local and remote LU will be used. A local LU is that LU which is directly connected to or serves the TP which sends or issues a verb and a remote LU is that LU which is directly connected to or serves the other transaction program. When transaction program sends an ALLOCATE, the local LU generates and sends to the remote LU a Function Management Header message [FMH-5 (Attach) defined in the cited manuals]. The only change required to the FMH-5 (Attach) is the addition of new hexadecimal value X'D2' to the existing conversation type field in this message. A remote LU receiving this message connects the remote transaction program to form the conversation.

As previously noted, both transaction programs were in reset state prior to the initiation of a conversation. The TP which issued the ALLOCATE goes to state (2) SEND_RECEIVE_RESTRICTED (SEND RCV RSTD) from state 1 when the ALLOCATE is sent and the remote partner TP upon being connected (shown as input "R, ATTACH" in FIG. 3) goes to state (3) SEND_RECEIVE_PRIVILEGED (SEND RCV PRVG). As indicated in FIG. 3, the TP in state 2 can send or receive a number of inputs. Some of these inputs, such as SEND_DATA will not cause a change of state, indicated by the symbol (-). Others, such as CONFIRM, will cause the program to change to another state (in case of CONFIRM, the TP changes to state 5). Those inputs which will not occur are indicated by the symbol (/) and inputs which will be rejected because they indicate an error condition are indicated by the symbol (>).

In the interest of brevity, the remaining inputs and states will be individually described and differences in form and function over the existing SNA LU Type 6.2 will be described.

In addition to the ALLOCATE and ATTACH inputs described above, twenty-eight other inputs are listed in FIG. 3 and are described below.

The SEND_DATA input is an existing verb in LU 6.2 and is unchanged except for the provision of four additional return codes. These are RECEIVE_ERROR, PROGRAM_RECEIVE_ERROR, SVC_RECEIVE_ERROR, and DEALLOCATE_NORMAL. The error return codes are new and are generated by the local LU as a result of receiving from the remote LU a -RSP, an FMH-7 (X'08890002'), an FMH-7 (X'08890102') or a Conditioned End Bracket (CEB) message, respectively. The remote LU creates these flows depending on the source of the error as defined in the architecture. The deallocate return code results from the partner TP issuing the DEALLOCATE verb with type (FLUSH) specified. It is an existing return code that is not returned on Send-Data when issued against a half-duplex conversation. These four return codes (RC) are listed as inputs in the FSM illustrated in FIG. 3 and can be generated by different sequences as will become apparent below.

The FLUSH input is an existing verb and is unchanged. In the absence of a FLUSH issued by the TP, the LU will buffer the data sent by the TP until the buffer is full, at which time the contents of the buffer are sent via the conversation to the remote LU. This delay can be overcome by the TP issuing the FLUSH verb to the local LU. This is advantageous in certain circumstances such as short query messages to a data base or application programs since the short messages would not fill the buffer.

The CONFIRM input is an existing verb issued by the TP and can receive as return codes the three new error return codes described above, i.e., RECEIVE_ERROR, PROGRAM_RECEIVE_ERROR, SVC_RECEIVE_ERROR. In addition, the LU returns control immediately to the TP and the OK return code only indicates that the CONFIRM was sent to the partner TP. The partner TP's reply to the CONFIRM request is passed to the TP on a subsequent RECEIVE_* verb, i.e., RECEIVE_AND_WAIT or RECEIVE_IMMEDIATE issued by the TP.

The SEND_ERROR_SEND and SEND_ERROR_RECEIVE are forms of the existing verb SEND_ERROR to which has been added a new parameter called DIRECTION to indicate in which direction (SEND or RECEIVE) the error occurred. SEND_ERROR_SEND, for example, indicates the TP has detected an error in the data it has been sending to its partner TP.

The POST_ON_RECEIPT input is an existing verb issued by the TP and is unchanged. The TEST input is also an existing verb issued by the TP and is provided with the same three new error return codes described The RECEIVE_IMMEDIATE input is an existing verb issued by the TP. In addition to the three new error return codes described above, a new value "CONFIRMED" has been added to the existing WHAT_RECEIVED parameter.

The RECEIVE_AND_WAIT input is also an existing verb which is issued by the TP and is provided with the three new error return codes described above and the WHAT_RECEIVED parameter has been provided with a new value "CONFIRMED". The REQUEST_TO_SEND input is an existing verb issued by the TP and in full-duplex it may have any meaning designated by the transaction program or not used.

The DATA_INDICATOR, CONFIRM_INDICATOR and CONFIRM_DEALLOC_IND inputs are existing WHAT RECEIVED values of DATA, CONFIRM and CONFIRM_DEALLOCATE, respectively, which are returned to the TP on the RECEIVE_* verb(s) which it issued. The CONFIRMED_INDICATOR input is a new WHAT_RECEIVED value of CONFIRMED which is returned to the TP on an issued RECEIVE_* verb.

The CONFIRMED input is an existing verb issued by the TP. The only protocol change is that a TP receiving a confirmation request need not reply immediately with a CONFIRMED, if appropriate. The RECEIVE_ERROR_RC, PROGRAM_ERROR_RC and SERVICE_ERROR_RC inputs are the three new error return codes described above. Each is returned to the TP on the verb it issued and indicates the nature of the error.

The DEALLOC_NORMAL_RC, DEALLOC_ABEND_RC, RESOURCE_FAILURE_RC and ALLOCATION_ERROR_RC are existing return code values of DEALLOCATE_NORMAL, DEALLOCATE_ABEND_*, RESOURCE_FAILURE_* and ALLOCATION_ERROR_*, respectively, and are returned to the TP as appropriate on a verb that it issued.

The DEALLOCATE_FLUSH input is an existing DEALLOCATE verb with TYPE(FLUSH) issued by the TP. The conditional end bracket (CEB) that flows as a result of this verb flows with a definite response requested and queued response required (RQD*, QRI) which differs from the existing protocol.

The DEALLOCATE_CONFIRM input is an existing verb (TYPE=CONFIRM) issued by the TP. The three new error return codes described above for SEND_DATA apply to this verb. The processing of this verb is modified since the LU returns control to the TP immediately and the returned OK only signifies that the CONFIRM_DEALLOCATE request has been sent to the partner TP. The partner's reply to the confirmation request is passed to the initiating TP on a subsequent RECEIVE_* verb. In addition, the CEB that flows as a result of the verb flows RQD*, QRI.

The DEALLOCATE_ABEND input is an existing DEALLOCATE verb (TYPE=ABEND_*) and issued by the TP. The CEB that flows as a result of the verb flows RQD*, QRI. The DEALLOCATE_LOCAL (TYPE=LOCAL) and GET ATTRIBUTES inputs are existing verbs issued by the TP. The SIGNAL (END-PURGING) input is neither a verb nor a line flow. It is an input to the FSM which indicates that an END_CHAIN indicator has been received and purging of incoming data can be terminated.

At this time the seventeen FSM states will be described. These states represent the state, with the exception of states 1 and 17, that the conversation occupies as viewed by TP and dictate, depending on the present state, the actions that the TP can take (i.e., inputs) as set forth in FIG. 3 and the result of taking that action (i.e., state transitions).

When a TP is in state 1 RESET, no conversation exists; however, a conversation can be initiated only from this state when the TP issues an ALLOCATE verb. State 17 END CONVERSATION (END CONV) is entered at the end of a conversation. This happens under a number of circumstances indicated by the numeral 17 in FIG. 3. A conversation may also terminate and the TP goes directly to state 1 in which no conversation exists. These transitions are indicated in FIG. 3 by the numeral (1).

In state 2, which is the SEND RECEIVE RESTRICTED (SEND RCV RSTD) state, the conversation is in a send or receive restricted state. The transaction program in this state may issue both send related and receive related verbs against the conversation. The principle restriction placed upon the conversation in this state is that a SEND_ERROR (DIRECTION=RECEIVE) cannot be issued by the transaction program against the conversation at this time. This is because the transaction program has not received a chain to which a negative response (-RSP) generated as a result of a SEND_ERROR may be sent. A review of FIG. 3 will indicate the allowable SEND verbs which can be issued on the conversation and receive indicators or return codes which can be received. In addition, the transition to states are indicated by the numerals in the figure. For example, if the transaction program issues a CONFIRM at this time, the FSM would change to state 5.

In state 3, SEND RECEIVE PRIVILEGED (SEND RCV PRVG), the conversation is in a privileged send or receive state. This state is similar to the SEND RCV RSTD state except that a SEND_ERROR (DIRECTION=RECEIVE) is allowed in addition to the other verbs that are allowed in the SEND RCV RSTD state. This is illustrated in FIG. 3 if one looks at the SEND_ERROR_RECEIVE input where if this input is provided when the conversation is in state 2 an error condition exists whereas in state 3 the input is accepted and the conversation makes a transition to state 4.

In state 4, SEND RECEIVE PURGE (SEND RCV PURGE), the transaction program has issued a SEND_ERROR (DIRECTION=RECEIVE) and the transaction program's LU purges all incoming data. Purging of incoming data is terminated when a flow carrying an end chain (EC) is received.

In state 5 SENT CONFIRM RESTRICTED (SENT CFRM RSTD) the transaction program has sent a confirm request to the partner transaction program and is awaiting the partner's reply. In state 5, as well as in all other states in which the TP has sent a confirmation request (states 6, 7, 9, and 11 through 16), the TP is disallowed from sending data until it has received the partner TP's response to the request it sent. The conversation will normally return to the SEND RCV RSTD state when the reply is received. This may be verified by looking at the column under state 5 in the state diagram illustrated in FIG. 3. When the program receives the confirm indicator, the conversation will return to state 2. It will also return to state 2 if the TP receives a RECEIVE_ERROR_RC return code. The other inputs and the states to which the conversation will move are illustrated in the column associated with state 5.

In state 6 SENT CONFIRM PRIVILEGED (SENT CFRM PRVG) the transaction program has sent a CONFIRM request to the partner transaction program and is awaiting the partner's reply. When the reply is received, the conversation will return to the SEND RCV PRVG state 3. This is illustrated in the column associated with state 6 and occurs upon receipt of the CONFIRMED_INDICATOR or the RECEIVE_ERROR_RC return code.

In state 7 SENT CONFIRM PURGE (SENT CFRM PURGE) the transaction program has sent a CONFIRM request to the partner transaction program and is awaiting the partner's transaction program's reply. The conversation returns to SEND RCV PURGE state 4 when a reply is received. The associated column indicates that this occurs when the transaction program receives a CONFIRM_INDICATOR or a RECEIVE_ERROR_RC return code.

In state 8 RECEIVED CONFIRM (RCVD CFRM) the transaction program has received a confirmation request (CONFIRM_INDICATOR) from the partner transaction program and has not yet replied to that request. The conversation insofar as the transaction program receiving the confirmation request is concerned will remain in this state until the transaction program responds to the request or takes some other action illustrated in the column associated with the RCVD_CFRM state. Moreover, in state 8, as well as in all other states in which the TP has received a confirmation request (states 9 to 13), the TP is disallowed from receiving information until it responds to the received request.

In state 9 CONFIRM CROSSING WITH CONFIRM (CRFM transaction program has both sent and received a confirmation request (CONFIRM and CONFIRM_INDICATOR, respectively) and has not yet responded to the received request. The conversation will move to state 5 upon either sending a SEND_ERROR_RECEIVE or a CONFIRMED, whichever is appropriate under the conditions existing at that time with respect to the received confirm.

In state 10 RECEIVED CONFIRMED DEALLOCATE (RCVD CFRM DEAL) the transaction program has received a confirm deallocate request (CONFIRM_DEALLOC_IND) and has not yet replied. The conversation will go to state 1 RESET upon the sending of a DEALLOCATE_FLUSH or a DEALLOCATE_ABEND. It will go to state 2 upon the sending of a SEND_ERROR_RECEIVE. The conversation will end by going to state 17 upon the sending of a CONFIRMED and will go to intermediate states 11 and 13 upon the sending of a CONFIRM or a DEALLOCATE_CONFIRM, respectively.

In state 11, CONFIRM CROSSING WITH CONFIRM DEALLOCATE (CFRM XING CFRM DEAL) the transaction program has sent a confirmation request (CONFIRM) and has received a confirmation deallocate request (CONFIRM_DEALLOC_IND). The conversation can go to state 5 upon sending a SEND_ERROR_RECEIVE or state 17 by sending a CONFIRMED.

In state 12, CONFIRM DEALLOCATE CROSSING WITH CONFIRM (CFRM DEAL XING CFRM) the transaction program has sent a confirm deallocate request (DEALLOCATE_CONFIRM) and has received a confirmation request (CONFIRM_INDICATOR). In this state, transition is allowed only to state 14, which will be described below and occurs when the transaction program sends either a SEND_ERROR_RECEIVE or a CONFIRMED.

In state 13, CONFIRM DEALLOCATE CROSSING WITH CONFIRM DEALLOCATE (CFRM DEAL XING CFRM DEAL) the transaction program has both sent and 1 received a confirm deallocate request (DEALLOCATE_CONFIRM and CONFIRM_DEALLOC_IND, respectively). From state 13, the conversation may revert to state 1 RESET upon receipt of the CONFIRMED_INDICATOR or to state 14 upon the sending of a SEND_ERROR_RECEIVE.

In state 14, SENT CONFIRM DEALLOCATE RESTRICTED (SENT CFRM DEAL RSTD) the transaction program has sent a confirm deallocate request (DEALLOCATE_CONFIRM) to the partner transaction program and is awaiting the partner's reply. The conversation will return to SEND_RCV_RSTD state 2 if the partner program replies negatively to the request. This occurs when the transaction program receives a RECEIVE_ERROR_RC return code. The conversation upon receipt of a CONFIRMED_INDICATOR will revert to the RESET state 1. The other state transitions for each of the received inputs are indicated in the associated column of state 14.

In state 15, SENT CONFIRM DEALLOCATE PRIVILEGED (SENT CFRM DEAL PRVG) the transaction program has sent the confirm deallocate request (DEALLOCATE_CONFIRM) to the partner transaction program and is awaiting the partner transaction program's reply. The conversation will return to SEND RCV PRVG state 3 if the partner transaction program replies negatively to the request. This is illustrated in the column associated with state 15 by receipt of the RECEIVE_ERROR_RC return code. Also, receipt of a CONFIRMED_INDICATOR will cause the conversation to go to the RESET state 1. The remaining transitions from state 15 are illustrated in the column associated with state 15 and include transitions to state 12, 13, 14 and 17 as indicated upon either the sending or the receipt of the indicated inputs.

In state 16, SENT CONFIRM DEALLOCATE PURGE (SENT CFRM DEAL PURGE) the transaction program has sent a confirm deallocate (DEALLOCATE_CONFIRM) request to the partner and is awaiting the partner tranaction program's reply. The conversation will return to SEND RCV PURGE state 4 if the partner program replies negatively to the request. This is indicated by receipt of the RECEIVE_ERROR_RC return code. In addition, receipt of the CONFIRMED_INDICATOR causes the conversation to go to the RESET state 1 and the other transitions are indicated in the column associated with state 16 upon receipt of the indicated inputs.

While the invention has been particularly shown and described with reference to a preferred embodiment thereof, it will be understood by those skilled in the art that various changes in form and detail may be made therein without departing from the spirit and scope of the invention.

We claim:

1. A method of operating a full duplex conversation between first and second transaction programs (TPs) over a communication network which includes at least first and second logical units LUs) connected, respectively, to the said first and second TPs and to each other by at least one communication session over which electronic signals representing both data and control are exchanged under control of said TPs, said method comprising the following steps:

at one of said TPs issuing a first unique input to the connected LU requesting the allocation of a conversation with the said other TP;

said LU generating and sending a unique first message indicating the requested conversation to the said other LU;

said other LU receiving said unique first message and generating and sending a unique second input to the said connected TP indicating an attach to complete establishment of the requested conversation;

at either or both of said TPs concurrently issuing one or more unique inputs for the purpose of sending and/or receiving data as required;

as required at a said one TP generating and sending a unique third input to the said connected LU requesting confirmation of previously transmitted data and thereafter inhibiting the sending of data pending receipt from the connected LU indicating confirmation from the partner TP;

receiving at the LU connected to the said one TP the said third input from the connected TP and generating and transmitting a unique second message indicating the requested confirmation via said session to the other LU;

receiving at the other LU the said unique second message and generating and second a unique fourth input indicating the requested confirmation to the TP connected thereto; and receiving the said unique fourth input at the said other TP and inhibiting the further receipt of data pending generating and sending of a unique fifth confirmation reply input to the connected LU.

2. A method as set forth in claim 1 including the further steps:

at one or both TPs sending an input to its connected LU indicating a termination of the conversation; and at the connected LU receiving the input indicating the termination of the conversation, generating and sending a fourth unique message to the LU associated with the other TP indicating the termination of the conversation and requesting a queued response which follows behind any unsent data from the other TP, if any whereby any data associated with the terminated conversation which has not been previously transmitted is purged from the network interconnecting the TPs.

3. A method of operating a full duplex conversation between first and second transaction programs (TPs) over a communication network which includes at least first and second logical units (LUs) connected, respectively, to the said first and second TPs and to each other by at least one communication session over which electronic signals representing both data and control are exchanged under control of said TPs, said method comprising the following steps:

at said first TP issuing a first unique input to the connected LU requesting the allocation of a conversation with the said other TP;

said connected LU generating and sending a unique first message indicating the requested conversation to the said other LU;

said other LU receiving said unique first message and generating and sending a unique second input indicating an attach to the said connected second TP to complete establishment of the requested conversation;

at both of said first and second TP issuing one or more unique inputs for the purpose of sending and/or receiving data as required;

said first TP generating and sending a unique third input to the said connected LU requesting confirmation of previously transmitted data and thereafter inhibiting the sending of data pending receipt from the connected LU indicating confirmation from the said second TP concurrently;

said LU connected to said first TP generating and sending via the session to the LU connected to the second TP a second unique message indicating the said request for confirmation;

said LU connected to said second TP providing an input to the second TP requesting confirmation of previously received data;

said second TP receiving said request for confirmation and inhibiting the further reception of data from its connected LU pending a response to the confirmation request;

said second TP generating and sending a said unique third input to the said connected LU requesting confirmation of previously transmitted data and thereafter inhibiting the sending of data pending receipt of a confirmation reply of previously sent data, from the said first TP;

said LU connected to said second TP receiving said unique third input of the said second TP and generating and sending via the session to the LU connected to the first TP a third unique message indicating the said request for confirmation;

said LU connected to said first TP receiving said third unique message and providing an input to the first TP indicating a request for confirmation; and said first TP upon receipt of said request for confirmation inhibiting the further receipt of data from its connected LU pending a response to the confirmation request, whereby both TPs will remain in an inhibited state for both the reception and transmission of data until each sends and receives a confirmation reply of previously sent data from the other whereupon further transmission and receipt of data within the established conversation may take place.

4. A method as set forth in claim 3 including the further steps:

at one or both TPs sending an input to its connected LU indicating a termination of the conversation; and at the connected LU receiving the input indicating the termination of the conversation, generating and sending a fourth unique message to the LU associated with the other TP indicating the termination of the conversation and requesting a queued response which follows behind any unsent data from the other TP, if any, whereby any data associated with the terminated conversation which has not been previously transmitted is purged from the network interconnecting the TPs.

5. A method of operating a full duplex conversation between first and second transaction programs (TPs) over a communication network which includes at least first and second logical units (LUs) connected, respectively to the said first and second TPs and to each other by at least one communication session over which electronic signals representing both data and control are exchanged under control of said TPs, said method comprising the following steps:

at one of said TPs issuing a first unique input to the connected LU requesting the allocation of a conversation with the said other TP;

said LU generating and second a unique first message indicating the requested conversation to the said other LU;

said other LU receiving said unique first message and generating and sending a unique second input to the said connected TP indicating an attach to complete establishment of the requested conversation;

at either or both of said TPs concurrently issuing one or more unique inputs for the purpose of sending and/or receiving data as required;

as required at a said one TP generating and sending a unique third input to the said connected LU requesting confirmation of previously transmitted data and thereafter inhibiting the sending of data pending receipt from the connected LU indicating confirmation from the partner TP;

at one or both TPs sending an input to its connected LU indicating a termination of the conversation; and at the connected LU receiving the input indicating the termination of the conversation, generating and sending a fourth unique message to the LU associated with the other TP indicating the termination of the conversation and requesting a queued response which follows behind any unsent data from the other TP, if any, whereby any data associated with the terminated conversation which has not been previously transmitted is purged from the network interconnecting the TPs.

* * * * *